US008306826B2

(12) United States Patent
Flam

(10) Patent No.: US 8,306,826 B2
(45) Date of Patent: *Nov. 6, 2012

(54) BIDIRECTIONAL NETWORK LANGUAGE SUPPORT

(75) Inventor: Moshe Flam, Bet Shemesh (IL)

(73) Assignee: International Business Machines Corporation, Armonk, NY (US)

( * ) Notice: Subject to any disclaimer, the term of this patent is extended or adjusted under 35 U.S.C. 154(b) by 1101 days.

This patent is subject to a terminal disclaimer.

(21) Appl. No.: 11/779,586

(22) Filed: Jul. 18, 2007

(65) Prior Publication Data

US 2008/0262830 A1  Oct. 23, 2008

Related U.S. Application Data

(63) Continuation of application No. 10/648,925, filed on Aug. 27, 2003, now Pat. No. 7,398,468, which is a continuation of application No. 09/444,683, filed on Nov. 22, 1999, now abandoned.

(30) Foreign Application Priority Data

Feb. 26, 1999 (EP) .................................... 99480004

(51) Int. Cl.
*G10L 21/00* (2006.01)
(52) U.S. Cl. ........ 704/277; 345/467; 704/260; 709/217; 715/236; 715/263; 715/264; 715/703; 719/328
(58) Field of Classification Search .................. 715/703, 715/263, 236, 264; 709/217; 345/467; 704/260; 719/328
See application file for complete search history.

(56) References Cited

U.S. PATENT DOCUMENTS

| 5,416,898 | A  |   | 5/1995  | Opstad et al. |
|-----------|----|---|---------|---------------|
| 5,784,069 | A  | * | 7/1998  | Daniels et al. ................ 345/467 |
| 5,812,122 | A  | * | 9/1998  | Ng ................................ 715/703 |
| 5,999,950 | A  | * | 12/1999 | Krueger et al. ................ 715/263 |
| 6,216,104 | B1 | * | 4/2001  | Moshfeghi et al. ........... 704/260 |

(Continued)

FOREIGN PATENT DOCUMENTS

JP   63-044221   2/1988

(Continued)

OTHER PUBLICATIONS

F. Avery Bishop et al., "Inside Windows 2000," MSJ, No. 58, pp. 38-50, 1998.

(Continued)

*Primary Examiner* — Michael Colucci
(74) *Attorney, Agent, or Firm* — Anne V. Dougherty; Ryan, Mason & Lewis, LLP

(57) ABSTRACT

A method and apparatus for displaying bi-directional text using a browser program on a computer (20) coupled to drive a display (22) and having an operating system such that the computer normally writes text to the display in a default language in a first, default direction. The computer opens a window (44) on the display and receives a string of codes, each code corresponding to a character in a passage of text (54), at least a portion of which is in a non-default language that is written in a second direction, opposite to the default direction. The computer displays the characters 10 corresponding to the codes in the window such that the passage of text is displayed with all portions thereof arranged in respectively-appropriate directions, substantially without reference to language support provided by the operating system or browser.

14 Claims, 6 Drawing Sheets

U.S. PATENT DOCUMENTS

| | | | |
|---|---|---|---|
| 6,292,827 B1 * | 9/2001 | Raz | 709/217 |
| 6,493,735 B1 * | 12/2002 | Kumhyr | 715/236 |
| 6,832,381 B1 * | 12/2004 | Mathur et al. | 719/328 |
| 7,398,468 B2 * | 7/2008 | Flam | 715/264 |
| 2004/0039996 A1 * | 2/2004 | Flam | 715/536 |

FOREIGN PATENT DOCUMENTS

| | | |
|---|---|---|
| JP | 64-021620 | 1/1989 |
| JP | 05-119755 | 5/1993 |
| JP | 10-214264 | 8/1998 |

OTHER PUBLICATIONS

Toshihiro Takada "Perfect Compatibility Test for WWW Browser Software," Internet Magazine, No. 41, pp. 196-215, 1998.

M.A. Batey et al., "Dual Orientation Display," IBM Technical Disclosure Bulletin, IBM, vol. 22, No. 2, pp. 814-816, Jul. 1979.

M.A. Batey et al., "Auto-Reverse Display Feature," IBM Technical Disclosure Bulletin, IBM, vol. 22, No. 2, pp. 817-819, Jul. 1979.

Z. Becker et al., "Triroff, an Adaptation of the Device-Independent Troff for Formatting Tri-Directional Text," Electronic Publishing, vol. 2, No. 3, pp. 119-142, Oct. 1989.

Hirokuni Kamiyoshi, "To Realize Multi-Language Circumstance in Personal Computers," Nikkei Personal Computing, Nikkei BP Inc., No. 324, pp. 153-159, 1998.

"Irregular DTP Multi-Language (Latter Part)," Windows DTP Nov. 1998, Kongakusha Co., Ltd., pp. 100-103.

* cited by examiner

BIDIRECTIONAL NETWORK LANGUAGE SUPPORT

CROSS-REFERENCE TO RELATED APPLICATION

This application is a continuation of U.S. application Ser. No. 10/648,925, filed Aug. 27, 2003, now U.S. Pat. No. 7,398,468 which is incorporated by reference herein. U.S. application Ser. No. 10/648,925 is a continuation of now abandoned U.S. application Ser. No. 09/444,683, filed Nov. 22, 1999, which is incorporated by reference herein.

FIELD OF THE INVENTION

The present invention relates generally to multiple language support in computer systems, and specifically to bi-directional language support over computer networks.

BACKGROUND OF THE INVENTION

In most computer network systems, including particularly the World-Wide Web and other forms of communication over the Internet, text is conveyed using the Latin alphabet or variants thereof. The systems are designed to support writing and reading from left to right. Similarly, common computer operating systems, such as the standard Microsoft Windows system, are designed for left-to-right text operation.

Variants of standard operating systems and Web software have been developed to afford bi-directional support and fonts for languages such as Arabic, Hebrew and Japanese. For example, special Windows operating systems are offered with National Language Support (NLS), which typically allows a user to switch back and forth between English and foreign language fonts and between left-to-right (LTR) and right-to-left (RTL) text operation. Some Web browsers also offer NLS. Computers sold with NLS operating systems generally have keyboards on which both the Latin and appropriate foreign language characters are printed. NLS must be pre-installed on the user's computer, and does not offer a solution to a user who wishes to read a foreign-language document or access a Web site without having the particular language support on his or her computer.

Two types of fonts are used for transmission and display of RTL text on the Web: logical fonts and visual fonts, which are also known as Web fonts. Logical fonts are used on bi-directional language support and font styles already present in the user's NLS operating system and/or browser. They can thus operate only in a NLS environment and are written to the computer display from right to left. Visual fonts also require that the font characters be installed on the user's computer, but do not require the computer to have NLS. Instead, special Hypertext Mark-up Language (HTML) code is used to select the foreign language characters and to write them to the computer display in RTL order, even though the letters must be entered in LTR order on the HTML page itself. If the user's computer has neither logical nor visual font support installed, the only way to transmit and display foreign language text is in graphic form, which is slow and inconvenient.

Thus, a user who wishes to view a Web page with Hebrew language text, for example, will generally be unable to do so unless the appropriate type of Hebrew language support has been installed on his or her computer. Furthermore, even if the user has Hebrew NLS installed, Hebrew Web texts will frequently be displayed in LTR order, rather than the appropriate RTL, because the user's browser is attempting to read a visual font as a logical font, or vice versa.

On-screen keyboards have been developed for users who wish to enter Hebrew characters from a computer that does not have Hebrew NLS. Such a keyboard is available, for example, at the "Snunit" Web site of the Hebrew University of Jerusalem (www.snunit.k12.il). A user selects characters from the keyboard by means of mouse clicks and can thus generate a line of text in web font form.

SUMMARY OF THE INVENTION

It is an object of the present invention to provide improved methods and devices for bi-directional computer language support. In some aspects of the present invention, the bi-directional support is used for transmitting and displaying RTL language texts over a network, particularly the Internet.

It is a further object of some aspects of the present invention to provide improved methods and devices for bi-directional entry of text into a computer, without requiring that the computer have the appropriate national language support.

It is yet a further object of some aspects of the present invention to provide improved methods and devices that enable a user to view a Web page including RTL national language text, without the necessity of installing national language support on the user's computer.

It is still a further object of some aspects of the present invention to provide methods and devices that enable a user to conveniently correct the direction of text flow displayed on a Web page, for example, when text in a RTL language is displayed from left to right due to confusion of logical and visual fonts.

In preferred embodiments of the present invention, a utility program enables a user of a computer to write and/or read bi-directional texts to and/or from the World Wide Web, typically including non-Latin characters in a selected RTL language. The program works regardless of whether there is an operating system or Web browser running on the computer that provides bi-directional language support. Preferably, the program comprises an applet written in the Java language, which is accessed by the user's Web browser program. Alternatively, the program may comprise an application program, preferably a Java application, which is downloaded to the user's computer. The program thus provides bi-directional support, for both logical and visual fonts in substantially any desired languages, without the necessity of installing a special operating system, browser or Web font support.

To enter bi-directional text into the computer, the user selects the appropriate text direction and character set, most preferably using controls and a model keyboard that the applet causes to be displayed on the user's computer screen. Preferably, the user is able to freely intersperse LTR text in a Latin alphabet and RTL text in the selected non-Latin alphabet. The applet causes text characters entered by the user to be displayed in the appropriate language and in the appropriate direction (LTR or RTL), as selected by the user. After the user has finished entering a passage of text, the passage is transmitted over the Web, most preferably as a standard coded character stream, using ASCII or ISO-standard codes.

A computer receiving the text sent by the user decodes the character stream to reconstruct the text as it was entered by the user. In a preferred embodiment, the receiving computer is used to view a Web page including the bi-directional text passage. Such a display may be achieved by means of any suitable operating system or browser having the necessary NLS or bi-directional capability, as is known in the art. Alternatively, an applet running on the viewing computer, preferably identical to the applet that was used to enter the text, is used to decode and display the text on the Web page. Most preferably, the applet is posted for downloading to the viewing computer along with the HTML code of the Web page.

In some preferred embodiments of the present invention, the applet running on the viewing computer generates a bi-directional window on the computer screen, in which all the characters, both Latin and in the selected non-Latin alphabet, are displayed using the appropriate alphabets and in the proper (LTR or RTL) order. The applet performs this function independently of whether the browser and operating system of the viewing computer have or do not have the appropriate bi-directional language support. As described hereinabove, when a Web page including text in a non-supported language is shown on the computer screen, the non-Latin portion of the text passage will normally appear on the screen as nonsense characters. A user of the viewing computer preferably drags and sizes the window generated by the applet, using a pointing device such as a mouse, for example, so that the window covers the text passage. Alternatively, the viewer cuts and pastes the text passage into the window. In either case, the applet reads the codes of the characters in the window and restores the characters to their appropriate form and order (RTL or LTR).

Preferably, the window includes an on-screen direction switch, so that the user can reverse the direction of display of RTL characters shown in the window. The switch allows the user to correct instantly for reversal of RTL character order between logical and visual fonts.

There is therefore provided, in accordance with a preferred embodiment of the present invention, a method for displaying bi-directional text using a browser program on a computer coupled to drive a display and having an operating system such that the computer normally writes text to the display in a default language in a first, default direction, the method including:

opening a window on the display;

receiving a string of codes, each code corresponding to a character in a passage of text, at least a portion of which is in a non-default language that is written in a second direction, opposite to the default direction; and displaying the characters corresponding to the codes in the window such that the passage of text is displayed with all portions thereof arranged in respectively appropriate directions, substantially without reference to language support provided by the operating system or browser.

Preferably, receiving the string of codes includes receiving an input keyed by a user of the computer and generating the string of codes responsive to the input. Most preferably, receiving the input includes displaying a keyboard in the non-default language on the computer display and receiving an input from the user responsive to the displayed keyboard, wherein displaying the keyboard includes varying the language of the keyboard display responsive to a selection by the user.

Further preferably, generating the string of codes includes writing codes to the string corresponding to the portion of the passage in the non-default language in a reverse order, such that the characters in the non-default language are displayed in proper order in the second direction.

In a preferred embodiment, the method includes transmitting the string of codes over a network.

Preferably, receiving the string of codes includes reading codes of characters located in an area of the display overlain by the window, wherein opening the window includes adjusting coordinates of the window so as to contain characters on the display corresponding to the string.

Alternatively, receiving the string of codes includes cutting and pasting characters on the display corresponding to the string so as to be contained the window.

Preferably, displaying the characters includes translating the codes of the characters on the display so that they appear in the window in an alphabet of the non-default language. Further preferably, translating the codes of the characters includes reversing an order of the converted characters so that they appear in their correct order in the non-default language, wherein reversing the order of the characters includes reversing an order of at least some of the characters in the window responsive to an order switch invoked by a user of the computer.

There is further provided, in accordance with a preferred embodiment of the present invention, a method for displaying bi-directional text using a computer coupled to drive a display and capable of writing text to the display in a first, default language, normally written in a first direction, and in a second language, normally written in a second direction opposite to the first direction, the method including:

opening a window on the display;

receiving a string of codes, each code corresponding to a character in a passage of text, at least a portion of which passage is in the second language;

displaying the characters corresponding to the codes in the window; and reversing the order of at least some of the displayed characters, responsive to an order switch invoked by a user of the computer, so that the portion of the passage in the second language is displayed with the characters properly ordered in the second direction.

Preferably, reversing the order of the characters includes displaying a switch control on the computer display, which control is selected by the user to invoke the order switch.

Preferably, in the methods described hereinabove, the first direction is left-to-right, and the second direction is right-to-left.

In a preferred embodiment, receiving the string of codes includes receiving the codes via a network. Preferably, receiving the string of codes includes receiving codes corresponding to a logical font. Alternatively, receiving the string of codes includes receiving codes corresponding to a visual font. Preferably, the network includes the World Wide Web, and displaying the characters includes applying an applet to process the codes.

There is also provided, in accordance with a preferred embodiment of the present invention, apparatus for displaying bi-directional text, including:

a display screen; and a computer running an operating system and a browser program and coupled to drive the display such that text is normally written to the display in a default language in a first, default direction, wherein the computer receives a string of codes, each code corresponding to a character in a passage of text, at least a portion of which is in a non-default language that is written in a second direction, opposite to the default direction, and causes the characters corresponding to the codes to be displayed in a window on the screen such that the passage of text is displayed with all portions thereof arranged in respectively appropriate directions, substantially without reference to language support provided by the operating system or browser.

Preferably, the apparatus includes a user input device, wherein the string of codes includes an input keyed by a user of the computer operating the input device, and wherein the computer transmits the string of codes over a network.

In a preferred embodiment, responsive to an input by a user, the computer overlays the window on an area of the display screen in which the characters are displayed, receives the string of codes corresponding to the characters in the area, and processes the codes so as to display the characters in their appropriate languages. Preferably, the computer reverses the order of the displayed characters in the portion of the text that is in the non-default language.

There is moreover provided, in accordance with a preferred embodiment of the present invention, apparatus for displaying bi-directional text, including:

a display screen; and a computer coupled to drive the display and capable of writing text to the display in a first, default language, normally written in a first direction, and a second language, normally written in a second direction opposite to the first direction, wherein the computer receives a string of codes, each code corresponding to a character in a passage of text at least a portion of which is in the second language, causes the characters corresponding to the codes to be displayed in a window on the screen, and reverses the order of at least some of the displayed characters, responsive to an order switch invoked by a user of the computer, so that the portion of the passage in the second language is displayed with the characters properly ordered in the second direction.

Preferably, the computer processes the codes by means of an applet.

There is additionally provided, in accordance with a preferred embodiment of the present invention, a computer program product, having computer readable program instructions embodied therein, which instructions cause a computer coupled to drive a display and having an operating system such that the computer normally writes text to the display in a default language in a first, default direction, to receive a string of codes, each code corresponding to a character in a passage of text, at least a portion of which is in a non-default language that is written in a second direction, opposite to the default direction, and to display the characters corresponding to the codes in a window on the display such that the passage of text is displayed with all portions thereof arranged in respectively-appropriate directions, substantially without reference to language support provided by the operating system or browser.

There is further provided, in accordance with another preferred embodiment of the present invention, a computer program product, having computer readable program instructions embodied therein, which instructions cause a computer coupled to drive a display and capable of writing text to the display in a first, default language, normally written in a first direction, and a second language, normally written in a second direction opposite to the first direction, to receive a string of codes, each code corresponding to a character in a passage of text, at least a portion of which passage is in the second language, to display the characters corresponding to the codes in a window on the computer display, and to reverse the order of at least some of the displayed characters, responsive to an order switch invoked by a user of the computer, so that the portion of the passage in the second language is displayed with the characters properly ordered in the second direction.

Preferably, the instructions include an applet, most preferably a Java applet.

The present invention will be more fully understood from the following detailed description of thereof, taken together with the drawings.

BRIEF DESCRIPTIONS OF THE DRAWINGS

DETAILED DESCRIPTION OF PREFERRED EMBODIMENTS

Figure 1:
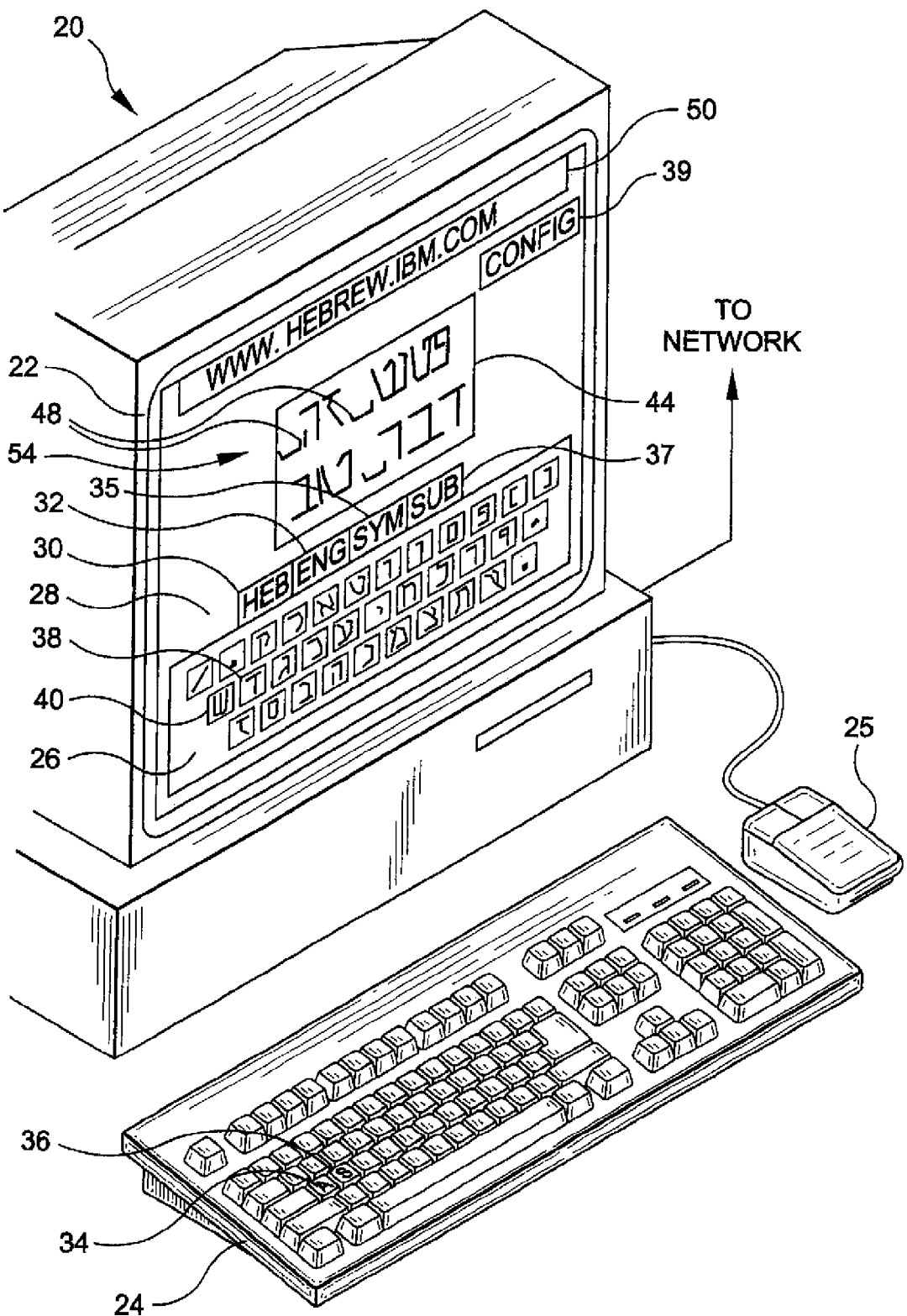
FIG. 1 is a schematic, pictorial illustration showing a computer used for entry of bi-directional text, in accordance with a preferred embodiment of the present invention.

Reference is now made to FIG. 1, which is a schematic, pictorial illustration of a computer 20 used for entry of bi-directional text, in accordance with a preferred embodiment of the present invention. The computer shown and described here is used, by way of example, for entry of English and Hebrew text, but it will be understood that any other language that is written from right to left could be used instead of Hebrew, for example, Arabic or Japanese. Computer 20 includes a display screen 22, a keyboard 24, a mouse 25 and a network connection, typically connecting to the Internet using a suitable browser program, as is known in the art.

In the present example, computer 20 is typically not equipped with Hebrew National Language Support (NLS), and keyboard 24 has keys 34, 36, etc., which are imprinted with only Latin characters. If a user of the computer wishes to enter Hebrew text, the user invokes a bi-directional support (BIDI) applet, which opens a window 28 on screen 22 in which an image of a bilingual keyboard 26 is displayed. The applet may be resident on computer 20 or read by the computer from tangible media, such as a diskette, or it may be downloaded from a server, typically associated with a Web site 50 with which computer 20 communicates via the network. The user operates keyboard 26 either by pointing to and clicking on keys 38, 40, etc., using mouse 25, or by depressing the corresponding keys on keyboard 24. Text generated using keyboard 26, as described hereinbelow, is displayed on screen 22 in a text window 44. Preferably, for each text character selected, the applet accesses and displays in the appropriate position in window 44 an image of the character. Such images may be stored and accessed as "GIF" files, for example. Alternatively, the applet uses standard visual fonts (Web fonts), but without the necessity of reconfiguring the browser for this purpose.

Preferably, window 28 includes on-screen control facilities for the user. The user selects whether keyboard 26 is to display Hebrew characters, English characters, or other characters, such as symbols, using respective buttons 30, 32 and 35, operated by mouse 25. Alternatively, the user may switch between the keyboard displays using special keystrokes, for example, <ALT><SHIFT> to switch between Hebrew and English. When text entry is complete, the user selects a submit button 37 or depresses the <ENTER> key on keyboard 24 to send the text to the server. A configuration control 39 enables the user to set translation parameters, such as the character code set that is used to represent the Hebrew characters sent to the server (ASCII or ISO-8859-8, for example, as are known in the art).

Figure 2:
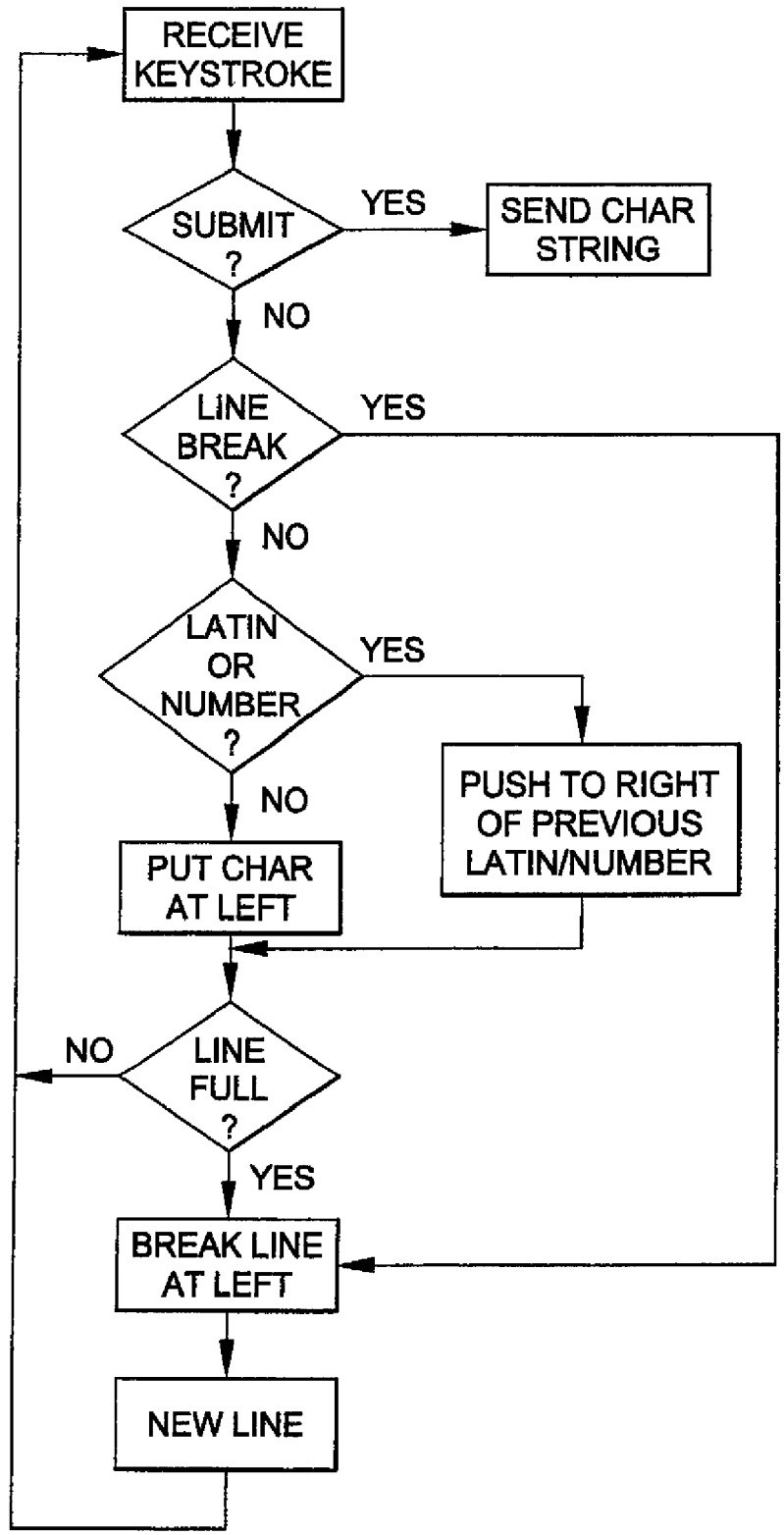
FIG. 2 is a flow chart that schematically illustrates the operation of an applet running on the computer of FIG. 1, in accordance with a preferred embodiment of the present invention.

FIG. 2 is a flow chart that schematically illustrates operation of the BIDI applet described with reference to FIG. 1, in accordance with a preferred embodiment of the present invention. The applet receives each of the keystrokes made on keyboard 24 or, alternatively or additionally, each of the keys selected on keyboard 26, and stores the keystrokes and/or selections in a buffer in a memory of computer 20. Whenever submit button 37 is selected or <ENTER> is depressed, the contents of the buffer are translated into the appropriate code string and sent to the server or, alternatively, stored on disk for later use.

Assuming that Hebrew operation has been invoked (by selecting button 30), each new keystroke or key selection received by the applet causes the corresponding character to be displayed at the left of the last line appearing in window 44. In order to achieve the desired right-to-left (RTL) display of the Hebrew characters, the keystrokes/selections corresponding to the characters in each line of window 44 are preferably stored in the buffer and sent to the server in reverse order. If English button 32 is selected, the applet begins to enter the characters in normal, forward order, putting each new letter to the right of the preceding English letter, until button 30 is again selected. Numbers are treated similarly to English letters, but special characters, such as punctuation marks, are not. Characters can also be entered, stored and displayed in the middle of a line using on-screen editing methods known in the art.

The BIDI applet counts the characters or sums the widths of characters in each line of text, and continues adding characters to that line until it is filled, or until the user invokes a new line (for example, by typing or selecting "\n"). When the applet detects a full line, it breaks the line at whichever one of spaces 48, between the characters in the line, is closest to the end of the line, which appears at the left side of window 44. In terms of the keystrokes/selections stored in the buffer, which are written in reverse order, this is the space that is closest to the beginning of the particular line. The applet inserts a linefeed code at the end of the line in the buffer (i.e., the beginning of the line displayed on screen). It then continues to store characters, again, in reverse order, in the next line. This process goes on until the user has finished creating a Hebrew (or bilingual) text passage 54, and then selects button 37 to submit the passage to the server.

Figure 3A:
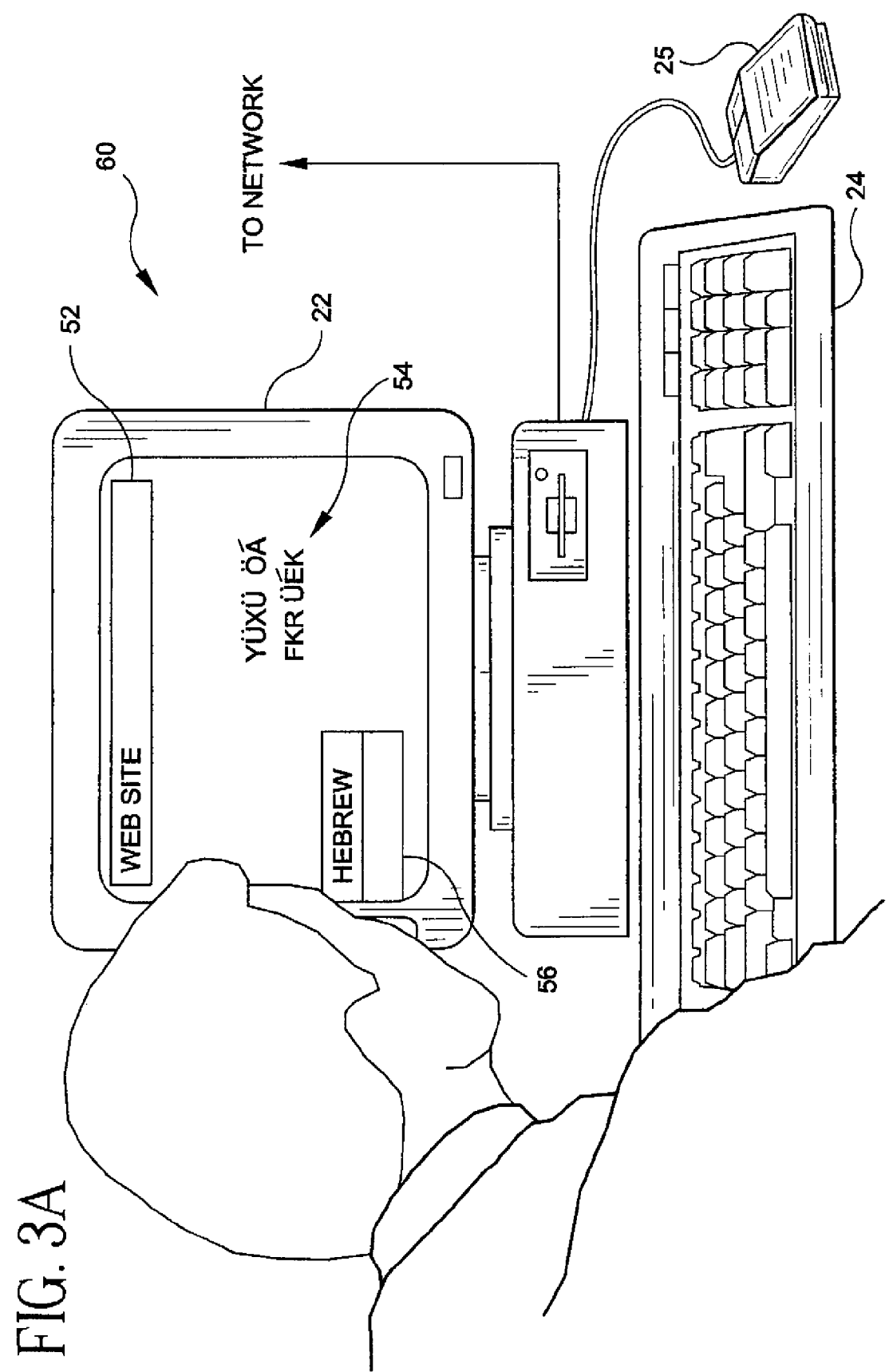
FIGS. 3A-3C are schematic, pictorial illustrations showing successive stages in a method of displaying bi-directional text on a computer, in accordance with a preferred embodiment of the present invention.

FIG. 3A is a schematic, pictorial illustration showing text passage 54, created in Hebrew, as it might appear on screen 22 of another computer 60 that does not have Hebrew NLS. The passage is shown as having been downloaded to computer 60 from a Web site 52. Passage 54 appears as nonsense characters on screen 22 due to the lack of Hebrew support on computer 60. In accordance with a preferred embodiment of the present invention, however, Web site 52 includes HTML code which generates a BIDI window 56 on screen 22. This window is associated with a BIDI applet, which may be downloaded from site 52 and/or stored on computer 60, and which converts the nonsense characters into the appropriate Hebrew characters, as described hereinbelow. The BIDI applet is preferably the same one used to generate the Hebrew passage, as described above, but may alternatively be a smaller applet without write capabilities. Although the example illustrated in FIGS. 3A-3C relates to the specific text passage 54 shown in FIG. 1, window 56 and its associated applet are equally applicable to decoding and displaying standard Hebrew text received from any source. The BIDI window and applet are particularly suited for viewing Web pages that include Hebrew text, whether using logical or visual fonts.

Figure 3B:
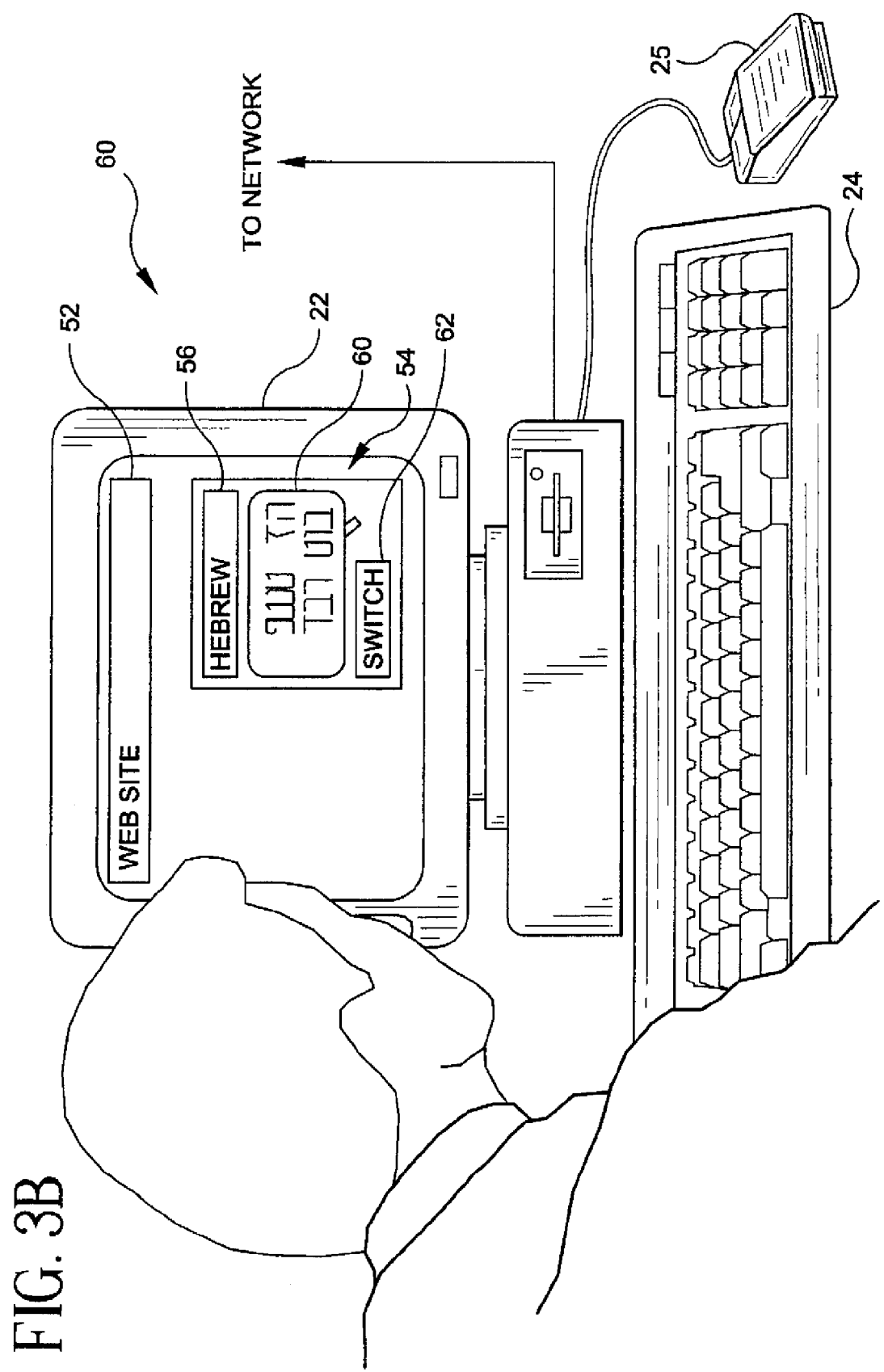
Figure 3C:
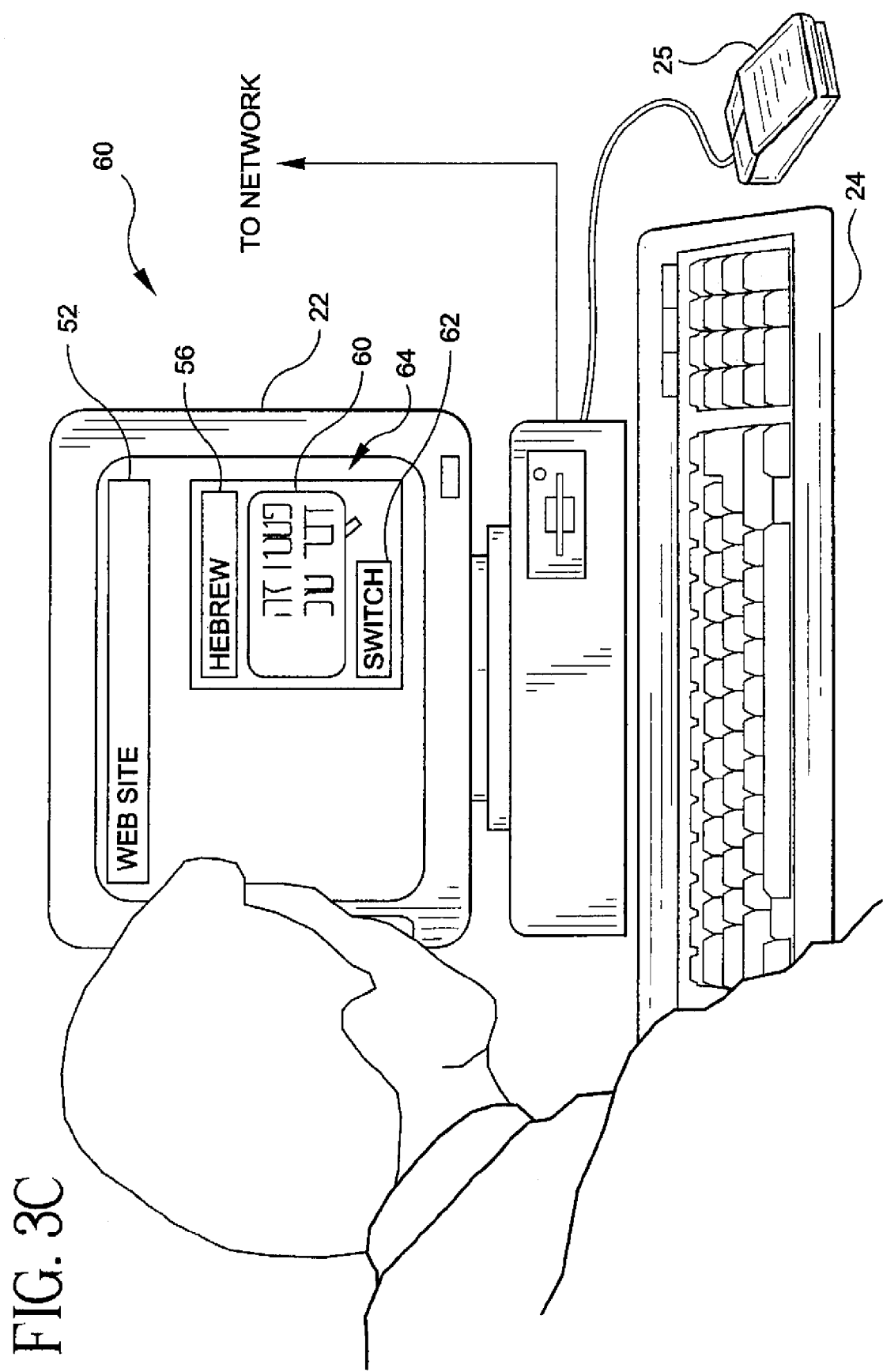
Figure 4:
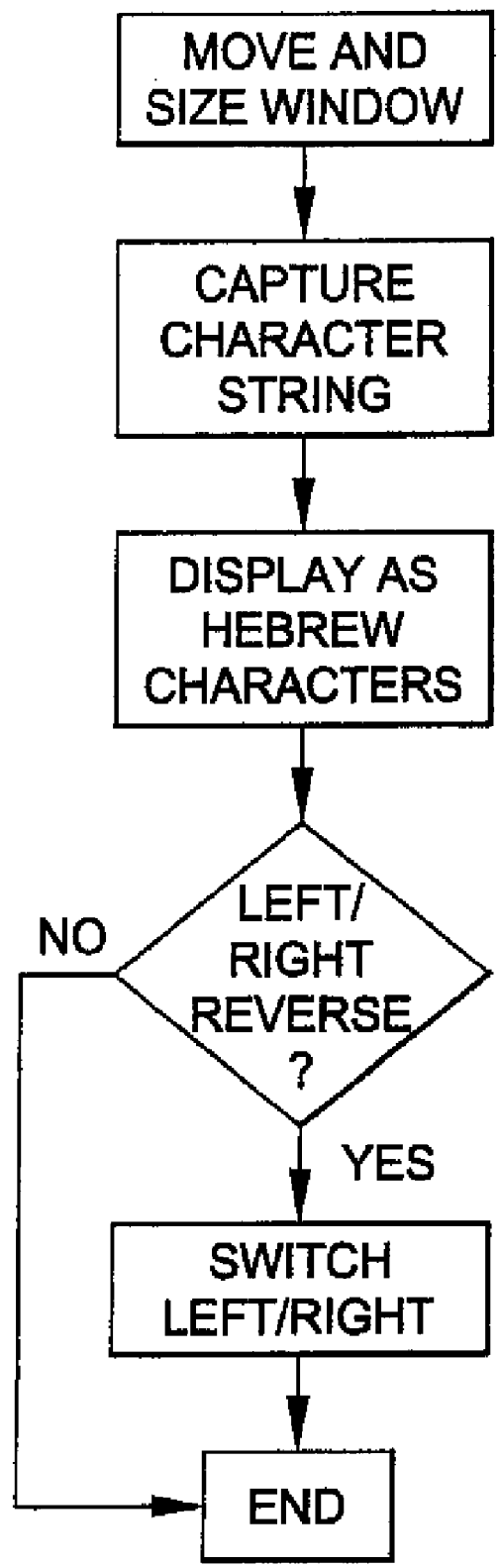
FIG. 4 is a flow chart that schematically illustrates the method used in FIGS. 3A-3C, in accordance with a preferred embodiment of the present invention.

FIGS. 3B, 3C and 4 illustrate the use of window 56 to convert passage 54 on screen 22 of computer 60 into intelligible Hebrew, in accordance with a preferred embodiment of the present invention. FIGS. 3B and 3C are schematic pictorial views of computer 60. FIG. 4 is a flow chart that schematically illustrates the operation of the BIDI applet.

As shown in FIG. 3B, in order to read passage 54, mouse 25 is used to move and size window 56 so as to overlie the passage. Window 56 includes a transparent region 60, in which the passage can be seen. Alternatively, the mouse is used to select and cut passage 54 and then to paste it into window 56. The BIDI applet reads the codes of the characters "captured" in region 60 and displays them as Hebrew characters, using graphic representations or a Web font, as described hereinabove. It is noted, however, that the Hebrew letters in passage 54 are still displayed in FIG. 3B from left to right, presumably because the passage in site 52 is represented by a logical font, while window 56 is set to receive a visual font, or vice versa.

To overcome this problem, mouse 25 is used to select a "switch" button 62 in window 56, which reverses the order of the Hebrew letters, as shown in FIG. 3C. Latin characters in the window are not reversed. Passage 54 is now returned to its original, intelligible form.

Although computers 20 (FIG. 1) and 60 (FIGS. 3A-3C) are characterized as not having Hebrew NLS in their operating systems or Web browsers, BIDI applets and associated tools such as those described herein may also be used with computers that do have partial or complete NLS. For example, Hebrew window 56 with switch button 62 provides a convenient way for overcoming the problem of viewing Hebrew visual fonts using a browser configured for Hebrew logical fonts, and vice versa. Further applications of the present invention, including applications in support of other languages, will be apparent to those skilled in the art.

It will be thus appreciated that the preferred embodiments described above are cited by way of example, and the full scope of the invention is limited only by the claims.

What is claimed is:

1. A method for displaying bi-directional text in a browser program on a computer coupled to drive a display and having an operating system such that the computer normally writes text to the display in a default language in a first, default direction, the method comprising:

invoking a bi-directional language support utility program for processing bi-directional language text displayed by the browser program on the computer independent of, and without the need for, bi-directional support provided by the operating system or the browser program, wherein processing bi-directional language text displayed by the browser program comprises:

the bi-directional language support utility program opening a window on the display, the bi-directional language support utility program displaying a virtual keyboard in the window to support input of text of a non-default language that is written and displayed in a second direction, opposite to the default direction;

the bi-directional language support utility program receiving a string of codes, each code corresponding to a character in a passage of text, at least a portion of which is input in the non-default language using the virtual keyboard;

writing codes to the string of codes corresponding to the portion of the passage in the non-default language in a reverse order such that the characters in the non-default language are displayed in proper order in the second direction; and the bi-directional language support utility program displaying the characters corresponding to the codes in the window such that the passage of text is displayed with all portions thereof arranged in respectively appropriate directions.

2. The method according to claim 1, wherein receiving the string of codes comprises receiving an input keyed by a user of the computer and generating the string of codes responsive to the input.

3. The method according to claim 1, wherein displaying the virtual keyboard comprises varying the language of the keyboard display responsive to a selection by the user.

4. The method of claim 1, further comprising permitting a user to selectively manipulate the passage of text or the window so that the passage of text is contained within the window.

5. The method according to claim 2, and comprising transmitting the string of codes over a network.

6. The method according to claim 1, wherein receiving the string of codes comprises reading codes of characters located in an area of the display overlaid by the window.

7. The method according to claim 6, wherein opening the window comprises adjusting coordinates of the window so as to contain characters on the display corresponding to the string.

8. The method according to claim 6, wherein receiving the string of codes comprises cutting and pasting characters on the display corresponding to the string so as to be contained within the window.

9. The method according to claim 6, wherein displaying the characters comprises translating the codes of the characters on the display so that they appear in the window in an alphabet of the non-default language.

10. The method according to claim 9, wherein translating the codes of the characters comprises reversing an order of the converted characters so that they appear in their correct order in the non-default language.

11. The method according to claim 10, wherein reversing the order of the characters comprises reversing an order of at least some of the characters in the window responsive to an order switch invoked by a user of the computer.

12. Apparatus for displaying bi-directional text, comprising:
a display screen; and
a computer, running an operating system and a browser program and coupled to drive the display such that text is normally written to the display in a default language in a first, default direction,
wherein the computer:
invokes a bi-directional language support utility program for processing bi-directional language text displayed by the browser program on the computer independent of, and without the need for, bi-directional support provided by the operating system or the browser program, wherein processing bi-directional language text displayed by the browser program comprises:
opening a window on the display with the bi-directional language support utility program, the bi-directional language support utility program displaying a virtual keyboard in the window to support input of text of a non-default language that is written and displayed in a second direction, opposite to the default direction;
receiving a string of codes at the bi-directional language support utility program, each code corresponding to a character in a passage of text, at least a portion of which is input in the non-default language using the virtual keyboard;
writing codes to the string of codes corresponding to the portion of the passage in the non-default language in a reverse order such that the characters in the non-default language are displayed in proper order in the second direction; and
causing the characters corresponding to the codes to be displayed in the window on the screen such that the passage of text is displayed with all portions thereof arranged in respectively-appropriate directions.

13. The apparatus according to claim 12, further comprising a user input device, wherein the string of codes comprises an input keyed by a user of the computer operating the input device.

14. The apparatus according to claim 13, wherein the computer transmits the string of codes over a network.

* * * * *